United States Patent Office 3,565,867
Patented Feb. 23, 1971

3,565,867
CYCLIZED POLYAMIDES FROM α-METHYLENE GLUTARIC ACID AND PROCESSES THEREFOR
John M. Hoyt, Cincinnati, and Karl Koch, Norwood, Ohio, assignors to National Distillers and Chemical Corporation, New York, N.Y., a corporation of Virginia
No Drawing. Filed Dec. 27, 1967, Ser. No. 693,762
Int. Cl. C08g 20/00
U.S. Cl. 260—78    24 Claims

ABSTRACT OF THE DISCLOSURE

This invention comprises polymerization reactions to give cyclized polyamides containing substantial amounts of piperidone rings and the products produced thereby.

This invention relates generally to direct, simplified methods for the synthesis of novel cyclized polyamides in which the structures of the cyclic portions include preponderantly piperidone rings, but in which glutarimide rings may also be present in minor amounts, as well as small amounts of linear, unsaturated polyamide structures. These processes more particularly relate to methods whereby the novel cyclized polyamide structures are produced by direct polycondensation under carefully controlled conditions of α-methyleneglutaric acid and its derivatives with various diamines.

Unsaturated polyamides have not been studied extensively as contrasted to unsaturated polyesters and the art relating to them is scant. A recent patent, U.S. 3,125,552, described a conventional, linear, unsaturated polyamide prepared from itaconic acid (methylenesuccinic acid) and diethylenetriamine, which is later epoxidized by reaction with epichlorohydrin, and finally reacted with ethenoid monomers, the products adapted for was in the development of high-wet-strength paper. Combinations of itaconic acid with dimerized and trimerized fatty acid treated with diamines give nonthixotropic gels French Patent 1,349,833). Low molecular weight (527) polyamides from itaconic acid and a diamine are described as corrosion inhibitors, see U.S. 2,908,711.

Maleic and fumaric acid-derived polyamides are combined with other polyamides and organosiloxane resins to produce insulating material in U.S. Pat. 2,983,700. Wire coating compositions have been described in which a polyester-amide derived from aliphatic ethylenically unsaturated decarboxylic acids and a primary amine alcohol was a component part, U.S. Pat. 2,989,491.

Various types of unsaturated polyamides have also been described in the literature. For example, the reaction of ethylene diamine with maleic anhydride yields poly (ethylene maleate) (Mihail, Bittman, and Rizea, J. Polymer Sci. 30, 423 (1958)). Unsaturated polyamides are also produced from maleic anhydride and 4,4′-diamino-3,3′-dimethyldiphenylmethane and its N,N′-diethyl derivative (Fedotova and Brysina, Vysokomolekul. Soedin., 2, 875 (1960)). The interfacial polycondensation of fumaryl chloride with various diamines is also reported to give unsaturated polyamides (Kolesnikov and Maloshitskii, Vysokomolekul. Soedin., 2, 1119 (1960)). Unsaturated polyamides are obtained from the polycondensation of hexamethylenediammonium - β - vinyladipate (Baron and Marshall, Makromol. Chem., 99, 243 (1966)).

Polycondensation of hexamethylenediammonium itaconate or hexamethylenediammonium fumarate, mixed with hexamethylenediammonium adipate or with caprolactam, gave polyamides containing unsaturation (Tokarev and Kudryavtsev, Vysokomolekul. Soedin., 6, 850 (1964)). The fumarate salt, even in small amounts (2–5 mole percent), invariably caused crosslinking and the production of insoluble polymer in ordinary melt polycondensation. To obtain soluble, high molecular weight unsaturated polyamides, it was found necessary to carry out the polycondensation in a cresolic solvent and to keep the content of fumarate salt below 10 mole percent. Tokarev and Kudryavtsev found, however, that up to 60 mole percent of itaconate linkages could be introduced into the copolyamides by melt polycondensation without causing crosslinking and insolubility. They found, however, when hexamethylenediammonium itaconate itself was heated in the melt at 210–215° C. for 2.5–3 hrs., a crosslinked polymer was obtained. This could be avoided only by performing the polycondensation by heating in cresol or, possibly by use of very brief synthesis times. It was inferred by Tokarev and Kudryavtsev that this polyamide contained unsaturation because of the ease of crosslinking in the molten state, but the presence of cyclic structures was not considered or suggested.

Production of cyclic structures in the preparation of polyamides with unsaturated acids was observed by Oda et al. (Kobunshi Kagaku, 17, 685 (1960); C. A. 55, 27263e; Makromol. Chem., 41, 254 (1960)). Itaconic acid was condensed in water or pyridine with ethylenediamine, hexamethylenediamine and N-carbethoxyhexamethylenediamine to yield bifunctional compounds containing one or two pyrrolidone rings; for example, from itaconic acid and hexamethylenediamine, N,N′ - (1,6 - hexamethylene)-bis(2-pyrrolidone-4-carboxylic acid) was obtained.

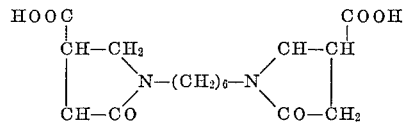

N,N′ - (1,6 - hexamethylene) - bis - (2-pyrrolidone - 4-carboxylic acid).

Reaction of these bifunctional monomeric compounds containing preformed pyrrolidone rings in a subsequent polycondensation with various diamines gave polyamides containing pyrrolidone rings.

It is an object of this invention to provide direct, simplified methods for the synthesis of cyclized polyamides of novel structure in which the cyclic portions are preponderantly piperidone rings, but in which, at times, glutarimide rings are also present in minor amounts, together with very small amounts of linear, unsaturated polyamide structures.

It is another object to produce cyclized polyamide structures by the direct polycondensation, under carefully controlled conditions, of α-methyleneglutaric acid and its derivatives with various diamines.

It is a further object to avoid the more complicated condensation methods presently known to the art in which cyclic polyamides are produced by first preforming a monomeric compound containing the cyclic structure and then reacting the said cycle-containing monomer with a diamine to produce a cycle-containing polyamide.

It is also an object of the invention to provide a novel polyamidification process for reacting α-methyleneglutaric acid which produces novel, heretofore unknown, useful cyclic polyamide products.

Other and further objects of the invention will become apparent from the detailed description set forth hereinafter.

The processes employed in this invention produce cyclized polyamides by the (1) melt polycondensation of a salt of a dicarboxylic acid and a diamine; (2) reaction of a dinitrile with a diamine and water; and (3) reaction of a diester with a diamine.

The invention includes processes for the direct polycondensation of α-methyleneglutaric acid, its dinitrile, and its diester with diamines to produce cyclized polyamides of novel structure in which piperidone rings predominate, but which may also contain minor amounts of glutarimide rings as well as very minor amounts of linear, unsaturated structures.

This invention process differs from the more complicated methods known to the art in which cyclic polyamides are produced by first preforming a monomeric compound containing the desired cyclic structures and then reacting the said cycle-containing monomer with a diamine to produce a cycle-containing polyamide.

The process of the invention can be illustrated by Equation A for the melt polycondensation of 1,n-alkanediammonium α-methyleneglutarate salt.

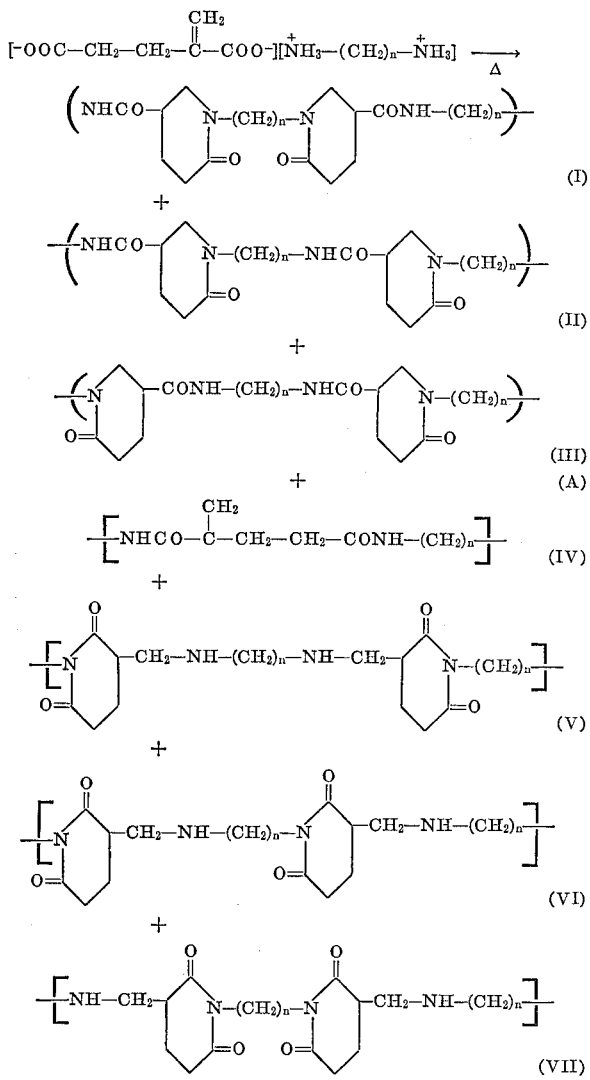

When the direct methods of polyamidification of this invention are applied to combinations of α-methyleneglutaric acid or its derivatives and various diamines, polyamides are produced whose recurring units have cyclized structures (I)–(III) and (V)–(VII), instead of the expected linear structure (IV). The evidence of spectral and chemical studies of the polyamides obtained show that the preponderant structures of the recurring units are those containing piperidone rings (I)–(III). However, spectral evidence (infrared) supports the presence of the glutarimide-type structures (V)–(VII) in relatively minor amounts under certain conditions. Infrared spectral evidence also suggests only very small contributions of the linear unsaturated structure (IV), which would be the expected product of the polycondensation.

It is believed from present evidence available that the sequences (I)–(VII) occur in a random manner in all the macromolecular chains.

Although the novel polyamides of this invention are readily prepared by the melt-polycondensation of a salt of α-methyleneglutaric acid and a diamine, they are also obtained by other methods of polyamidification, for example, by reacting an equimolar mixture of α-methyleneglutaronitrile and a diamine with water, or alternatively by heating an equimolar mixture of an ester of α-methyleneglutaric acid and a diamine. In each instance novel cyclized polyamides having recurring units represented by the structures (I)–(III) and (V)–(VII) are obtained in which the piperidone ring sequences (I)–(III) predominate.

Even if it were assumed that such cyclization reactions are to be expected because of structural relationships favoring ring formation, it is most surprising and unpredictable that such intramolecular ring closure reactions would overshadow so completely related intermolecular reactors leading to gelation that only insignificant amounts of gel formation 10% or less would be encountered in the polyamide synthesis.

In one embodiment of the invention, a salt of α-methyleneglutaric acid and diamine is heated under critical conditions to effect polyamidification. A soluble, high molecular weight cyclized polyamide is obtained. Analysis shows the polyamide is comprised principally of the recurring cyclized, piperidone structures (I), (II), and (III), and that the contribution of the linear unsaturated structure (IV) is very small. In some instances minor contributions of the glutarimide cyclic structures (V)–(VII) are detected as well. In this preferred embodiment, a salt such, as for purposes of example only, hexamethylenediammonium α-methyleneglutarate, is placed in a pressure-resistant vessel under nitrogen or argon and heated at an elevated temperature for a time under autogenous pressure. The reaction vessel is cooled, vented, and again heated, but under a purge of nitrogen or argon to remove water vapor. Finally the contents of the vessel are heated under vacuum to remove remaining traces of water and to drive the polycondensation to completion. The vessel is cooled, opened, and the polyamide product is removed.

In another embodiment, α-methyleneglutaronitrile, a diamine, and sufficient water to produce amide groups are heated in a three-step cycle, first under autogenous pressure, then under atmospheric pressure, and finally in vacuum to produce a polyamide similarly made up essentially of recurring cyclized sequences of the piperidone structure (I)–(III) and in some instances the glutarimide structures (V)–(VII). For example, an approximately equimolar mixture of α-methyleneglutaronitrile and a diamine, together with at least two molar equivalents of water based on the α-methyleneglutaronitrile, are heated under autogenous pressure in a pressure-resistant vessel. After the heating is finished the vessel is cooled, vented to let ammonia escape, heated under a nitrogen or other inert gas purge to remove the bulk of the water, and then finished by heating under high vacuum to remove traces of water and to force the polycondensation to completion. The vessel is cooled, opened, and the polyamide product is removed.

In a third embodiment, a diester of α-methyleneglutaric acid is heated with a diamine until substantially all the alcohol of the ester is eliminated. A polyamide is obtained whose structure is made up of the recurring cyclized piperidone sequences (I)–(III), with minor contributions from the glutarimide sequences (V)–(VII). As an example in this third embodiment of the invention, an approximately equimolar mixture of diethyl α-methyleneglutarate and a diamine are heated under autogenous pressure, then under atmospheric pressure, and finally under vacuum to produce a similar polyamide product.

It is believed that the driving force for the novel polyamidification-cyclization process of this invention is the production of the sterically-favored six-membered piperidone rings of structures (I), (II), and (III). It is apparent that the addition of N-H to the activated methylene group which participates in the cyclization might also occur in an intermolecular fashion to lead to crosslinking. The fact that gel fractions in these novel polyamidification-cyclization reactions are low or absent (10% or less) at the critical selected polycondensation temperatures (180–230° C.) is further evidence that the cyclization reaction is favored. High reaction temperatures, however, of about 270–300° C. favor vinyl polymerization involving the double bonds, although radical inhibitors can prevent this undesirable effect.

Although the cyclized polyamide is obtained under the described conditions, it is still possible to prepare the essentially unsaturated polyamide whose structure is represented by the sequence Formula IV. Interfacial polycondensation of $\alpha$-methyleneglutaryl dichloride with a diamine at low temperatures is employed in this synthesis, as described in Example III. The unsaturated polyamide thus produced, however, differs radically in its properties from the cyclized polyamides which are the subject of this invention.

The acid reactant component in the polyamidification can be an $\alpha$-methyleneglutaric acid of the general structure

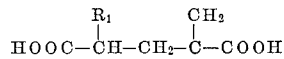

wherein $R_1$ may be hydrogen, a lower alkyl group such as methyl, ethyl, etc.; a cycloalkyl group such as cyclohexyl or cyclopentyl; or an aryl group such as phenyl. It is to be further understood that the $\alpha$-methyleneglutaric acid can be used as a diamine salt, as its dinitrile, and as a diester. When the acid is used as its diester, a simple dialkyl ester, such as the dimethyl ester, the diethyl ester, the di-n-butyl ester, or an aromatic ester such as the diphenyl ester, is contemplated for use.

Examples of useful $\alpha$-methyleneglutaric acids include $\alpha$-methyleneglutaric acid, $\alpha$-methylene-$\gamma$-methylglutaric acid, $\alpha$-methylene-$\gamma$-cyclohexylglutaric acid, and $\alpha$-methylene-$\gamma$-phenylglutaric acid. Mixtures can be employed if desired.

The diamine reactant component used corresponds to the formula

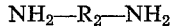

and is primary diamine in which the hydrocarbon divalent radical, $R_2$, may be a linear polymethylene chain containing from 2 to 12 methylene groups, such as in ethylenediamine, trimethylenediamine, hexamethylenediamine, decamethylenediamine, and dodecamethylenediamine; a polymethylene chain containing from 2 to 12 methylene groups in which 1–3 methylenic hydrogens are substituted by lower alkyl groups such as methyl, ethyl, etc., as in 2-methylpentamethylenediamine and 2,5-dimethylhexamethylenediamine; a polymethylene chain in which phenylene nucleus is inserted between two adjacent methylene groups, as in p-xylylenediamine, m-xylylenediamine, and 1,4-(2-aminoethyl)benzene; and an arylene divalent radical such as a p-phenylene divalent radical, a m-phenylene divalent radical, and a p,p'-biphenylene divalent radical. Mixtures can likewise be employed.

In the polycondensation of a salt formed from $\alpha$-methyleneglutaric acid and a diamine the ratio of the two reactants is fixed because the salt has the invariable 1:1 composition (molar). The polycondensation is carried out in three cycles. In the first or pressure cycle the salt is heated at autogenous pressure at temperatures which vary broadly from 125–260° C. The preferred range is 180–230° C. Higher temperatures (265–70° C.) lead to the production of a crosslinked gel. The heating is carried out for a period ranging broadly from 0.5–24 hrs. with a range of 1–6 hours being preferred. In the second or atmospheric pressure cycle the heating is carried out over the same broad and preferred temperature ranges. The time of heating is shorter, broadly 0.25–6 hrs., with 0.5–2 hrs. being preferred. In the third or vacuum cycle the polyamide is heated over the same temperature ranges, for periods of broadly 1–10 hrs. with 1–5 hrs. being preferred. The pressure in the vacuum cycle is 0.001–10 mm. Hg, 0.01–5 mm. being preferred. During the polycondensation contact with air is avoided. An inert atmosphere such as nitrogen or argon is maintained throughout the reaction period.

In the polycondensation starting from the dinitrile of the $\alpha$-methyleneglutaric acid component, diamine, and water, the mole ratio of dinitrile: diamine ranges from 1:0.5 to 1:1.5 broadly, and from 1:0.8 to 1:1.2 preferred. The mole ratio of water to dinitrile ranges broadly from 2–25 moles of water per mole of dinitrile, with a range of 3–15 being preferred. The pressure cycle is carried out over a range of 125 to 260° C., 150–230° C. being preferred. The pressure cycle duration is 2–48 hrs. broadly, with 10–20 hrs. preferred. The atmospheric cycle is performed at 160–250° C. for 0.5–6 hrs.; 180–220° C. for 1–3 hrs. being preferred. The vacuum cycle is carried out at 150–260° C. for 0.5–12 hrs. at 0.001–10 mm. Hg, 180–220° C. for 1–8 hrs. at 0.01–5 mm. Hg preferred. An inert atmosphere of nitrogen or argon is maintained.

In the polycondensation starting from the diester of the $\alpha$-methyleneglutaric acid component and the diamine, the mole ratio of diester:diamine ranges from 1.0:0.5 to 1.0:1.5 broadly and from 1.0:0.9 to 1.0:1.1, preferred. The pressure cycle is carried out at 150–250° C., 180–220° C. being preferred. The atmospheric cycle is carried out for 0.25–10 hrs., 0.5–3 hrs. being preferred. The vacuum cycle is carried out at 120–240° C., 180–220° C. being preferred, at a vacuum pressure of 0.001–10 mm. Hg, 0.01–5 mm. Hg being preferred. An inert atmosphere of nitrogen or argon is likewise maintained.

Because of the strong adhesive properties of the polyamides of this invention it may be necessary to extrude the molten polymer from the reactor by means of pressure. In smaller scale operations in which steel pressure vessels are employed it is frequently convenient to coat the inside parts of the reactor which come into contact with the polyamide with non-sticking polytetrafluoroethylene resin (Teflon) formulations to provide for easier removal.

There is experimental evidence to indicate careful control is required if uncrosslinked, soluble, high molecular weight, cryclized polyamides are to be obtained. The polycondensation reaction temperature is quite critical. For example, in preparing a cyclized polyamide from hexamethylenediammonium $\alpha$-methyleneglutarate, temperatures of 265–270° C. lead to insoluble, crosslinked gel. Optimum temperatures appear to be about 180–230° C., in which range essentially soluble (90% or higher) high molecular weight, cyclized polyamide products are obtained (see Table 1). Furthermore, in the polycondensation of 2-methylpentamethylenediammonium $\alpha$-methyleneglutarate, gels are obtained even as low as 215–225° C., whereas soluble, cyclized polymer is formed at 180–195° C. (See data of Table 2.)

Gelation at high temperatures can be substantially eliminated by adding vinyl polymerization inhibitors, for example, isooctyl $\beta$-(3,5-ditertiary-butyl - 4 - hydroxybenzylthio)propionate (shown in Table 1), although somewhat lower molecular weights may be obtained. However, such inhibitors are not required to obtain satisfactory products at the preferred optimum polycondensation temperatures (Table 1, Ex. IC–(4), IC–(5)).

In all stages of the variations of the process of this invention an inert atmosphere is preferably maintained to prevent vinyl polymerizations which are promoted by oxygen. Such inert gases as nitrogen, argon, helium, and the like are used. In any event, oxygen should be excluded.

The novel cyclized polyamides of the invention show very high solubility in methyl alcohol and are of utility in printing inks. These novel products also show high adhesion to glass and to metals and are thus of value in adhesives. These novel cyclized polyamides can also be crosslinked with peroxides to produce elastomeric compositions having high resistance to aromatic and aliphatic hydrocarbons.

EXAMPLE I

Cyclized polyamide from 1,6-hexamethylenediammonium α-methyleneglutarate (A) Preparation of α-methyleneglutaric acid: To a refluxing solution of 1750 ml. of concentrated hydrochloric acid solution and 1750 ml. of deionized water was added, over a period of 30 minutes, 371 g. (3.50 moles) of α-methyleneglutaronitrile. After a 10 hour additional refluxing period the solution was allowed to cool. Standing overnight resulted in crystallization of the α-methylenegluataric acid and produced 296.2 g. (58.9%), M.P. 129–31° C., of the product.

(B) Preparation of corresponding salt: To a solution of 15.7 g. (0.109 mole) of α-methyleneglutaric acid in 121 ml. of ethanol was added a solution of 12.9 g. (0.1113 mole) of hexamethylenediamine in 22 ml. of ethanol. The turbid solution was induced to crystallize by cooling with solid carbon dioxide. The crystalline mass was collected, washed twice with cold ethanol, and dried, to afford 23.7 g. (83.4%) of hexamethylenediammonium α-methyleneglutarate as a white, granular solid, M.P. 151–2° C.

Calculated for $C_{12}H_{24}N_2O_4$ (percent): C, 55.36; H, 9.29; N, 10.76. Found (percent): C, 55.62; H, 9.20; N, 11.06.

The proton NMR spectrum (60 mc.) of a formic acid solution of the salt showed two peaks at 5.13 and 5.66 p.p.m. ($\delta$) to tetramethylsilane for vinylidene protons on a conjugated carbon-carbon double bond. Similar chemical shifts are observed in the NMR spectrum of methacrylamide at 5.38 and 5.77 p.p.m. and are also associated with vinylidene protons (Varian spectrum No. 71, Varian spectrum catalog. Varian Associates, Palo Alto, California, 1962).

The presence of approximately the theoretical amount of unsaturation was shown independently by the bromine-bromide method (F. E. Critchfield, Anal. Chem., 31, No. 8, 1406 (1959) using a sample of hexamethylenediammonuim α-methyleneglutarate, M.P. 143–147° C., prepared in the same manner. These results are shown in the following tabulation:

Bromination time, min: | Effective equivalent weight, g.
---|---
10 | 256.5
30 | 256
60 | 252.5
120 | 251

The effective equivalent weight is the weight of substance having one carbon-carbon double bond. The theoretical equivalent weight for the salt is 260.4 g.

The above NMR and bromination data show that the salt contains the expected unsaturation and that cyclization does not occur during salt formation. C(1) Preparation of Polyamide: A 4.419 g. (0.170 mole) portion of hexamethylenediammonium α-methylenegluarate (HMDMG) was sealed in a nitrogen-filled, heavy-walled glass tube and heated for 2 hours at 215–220° C. (a) (pressure cycle). The tube was cooled, opened, capped with a rubber serum cap, and a long stainless steel hypodermic needle was passed into the tube so that it extended into the polymer mass. With nitrogen flowing through the needle, the tube was heated 30 minutes at 215–220° C. under atmospheric pressure of nitrogen (b) (atmospheric cycle). The nitrogen flow was then decreased, vacuum (0.5–1.5 mm.) was applied to the tube, and heating was continued for 1 hour at 220–225° C. (c) (vacuum cycle). After cooling, a clear, colorless, tough polyamide resin product was removed from the tube, 3.82 g. (100% conversion). The polyamide softened at about 100° C. and was soluble in m-cresol, methanol, and formic acid. A solution containing 50% by weight of the polyamide in methanol was prepared at room temperature. The inherent viscosity was 1.2 dl./g. (0.475 g./100 ml. m-cresol, 24.3° C., 5% gel removed). The polyamide adhered strongly to glass and to steel.

Several further glass-tube polymerizations are summarized in Table 1 presented hereinbelow. Example IC(2) demonstrates that when the reaction is carried out at temperatures as high as 265–270° C., the polyamide product isolated is insoluble in solvents such as m-cresol and formic acid although these solvents dissolve polymers made at lower temperatures, i.e., at 215–220° C. as demonstrated in Example IC(1) above. By this behavior it is evident that such insoluble polymers are crosslinked and that high synthesis temperatures must be avoided if the objective is to obtain soluble, non-crosslinked polyamides.

Example IC(3) (Table 1) shows that the addition of isooctyl$\beta'$-(3,5-di-tertiary butyl-4-hydroxybenzylthio) propionate as an inhibitor of vinyl polymerization permits soluble polymer to be obtained at 265–270° C., but the molecular weight is relatively low. The remaining Examples IC(4) and IC(5) show that at 220–225° C., soluble polymer of inherent viscosity of one or above can be obtained with or without added inhibitor.

TABLE 1.—PREPARATION OF CYCLIZED POLYAMIDES FROM HEXAMETHYLENEDIAMMONIUM α-METHYLENEGLUTARATE (HMDMG)

| Example No. | HMDMG charged, g. | Inhibitor,[1] g. | Pressure | | Heating cycle [2] Atmos., N₂ | | Vacuum | | Percent conversion | $\eta_{inh}$[3] | Remarks |
|---|---|---|---|---|---|---|---|---|---|---|---|
| | | | ° C. | Hrs. | ° C. | Hrs. | ° C. | Hrs. | | | |
| IC (2) | 5.185 | None | 215–25 | 2 | 265–70 | 0.5 | 265–70 | 1 | High | Insoluble | Polyamide insoluble in m-cresol and in formic acid at 140° C. |
| IC (3) | 5.025 | 0.078 | 215–25 | 2 | 265–70 | 0.5 | 265–70 | 1 | 98.0 | 0.784 | Polyamide 93% soluble in m-cresol. |
| IC (4) | 4.693 | 0.050 | 215–20 | 2 | 220–5 | 0.5 | 220–5 | 1 | 94.1 | 1.00 | Polyamide 97% soluble in m-cresol. |
| IC (5) | 4.564 | None | 215–20 | 2 | 215–20 | 0.5 | 220–5 | 1 | 100 | 1.40 | Polyamide 99% soluble in m-cresol. |

[1] Isooctyl β-(3,5-di-tert.-butyl-4-hydroxybenzylthio) propionate.
[2] The heating cycle is identical to that described in Example IC-1.
[3] Inherent viscosity was determined in m-cresol, 0.50 g./100 ml. at room temperature. Solutions were heated at 150° C. and filtered before determination; amount of gel present is shown in remarks column.

EXAMPLE II (A) Preparation of polyamide

In a manner similar to that described in Example I, but using a 1 in. x 12 in. stainless steel pipe reactor coated on the inside with a non-sticking coating of polytetrafluoroethylene (Teflon) resin there was placed 40.0 g. of hexamethylenediammonium α-methyleneglutarate. The reactor was evacuated and filled with nitrogen three times and heated in a temperature-controlled bath under the following conditions:

(a) Pressure cycle: 2 hrs. at 215–220° C.
(b) Atm. pressure cycle: 30 min. at 215–220° C.
(c) Vacuum cycle: 1 hr. at 220–225° C. at 0.5–1 mm. Hg The reactor was cooled and opened. The polyamide was readily removed from the reactor, as clearly defined upper and lower portions. The upper portion, 17.39 g. (50.6%), was a clear but somewhat brittle resin, inherent viscosity 0.715 dl./g.; the lower portion was a clear, tough polymer, 15.95 g. (46.5%), inherent viscosity 1.60 dl./g. A specimen of the lower portion was thoroughly dried for elemental analysis.

Calculated for $(C_{12}H_{20}N_2O_2)_n$ (percent): C, 64.26; H, 8.99; N, 12.49. Found (percent): C, 63.28; H, 8.96; N, 12.29.

In a similar experiment in which the pipe reactor was not coated on the inside, great difficulty was encountered in removing the polyamide product because of the strong adhesion of the resin to steel.

(B) Proof of structure of polyamide (1) Polymer purification: Two portions (18.8 and 19.5 g.) of polyamide prepared in a coated stainless steel reactor as described above in Example II (A) were dissolved at room temperature in 400 ml. methanol, the solution filtered to remove dirt particles, and the polyamide reprecipitated in 4–5 volumes of acetone. The polymer was separated mechanically from the mother liquor, washed with acetone, and finally dried, 33.0 g. (86.4% recovery), pale yellow, tough foam, $\eta_{inh}=1.02$ dl./g.

Calculated for $(C_{12}H_{20}N_2O_2)_n$ (percent): C, 64.26; H, 8.99; N, 12.49. Found (percent): C, 64.33; H, 9.40; N, 12.35.

(2) Spectral analysis: The attenuated total reflectance (ATR) infrared spectrum of the repreciptated polymer was examined. Very small absorption is found at 935 cm.$^{-1}$, and is attributable to a terminal methylene group. This absorption is much weaker than the absorption observed in this region (918 cm.$^{-1}$) in the spectrum (KBr pellet) for authentic poly(hexamethylene $\alpha$-methyleneglutaramide) prepared by interfacial polycondensation as described in Example III hereinbelow. The ATR spectrum of the polyamide of this example further contains a weak band for NH at 3260 cm.$^{-1}$; a very weak amide absorption at 3070 cm.$^{-1}$; sharp bands at 2920 and 2850 cm.$^{-1}$ for methylenic hydrogen; strong absorption in the carbonyl region at 1630 cm.$^{-1}$, with shoulders at 1628, 1638, and 1658 cm.$^{-1}$; and a broad amide II band at 1540–1530 cm.$^{-1}$. Medium bands are present at 1490 cm.$^{-1}$, 1460–1430 cm.$^{-1}$, 1385–70 cm.$^{-1}$, and 1230 cm.$^{-1}$, with shoulders at 1260 and 1208 cm.$^{-1}$. A shoulder at 720 cm.$^{-1}$ in a broad absorption region can be attributed to 3 or more adjacent $CH_2$ groups. No absorption is noted at 1680–1720 cm.$^{-1}$ which indicates the absence of the CONRCO group and consequently the absence of structures (V)–(VII).

The spectrum of the purified polyamide did not differ significantly from the spectrum of the unpurified polyamide indicating no structural change occurs on purification.

The NMR spectrum was obtained for the purified polymer dissolved in hexafluoroisopropanol. Peaks for this polymer were observed as follows:

| Peak, p.p.m. ($\delta$) to tetramethylsilane | Structure | No. of hydrogens |
|---|---|---|
| 6.2 | —NH—CO— | 2 |
| 3.4 | —CH$_2$—N— | 12 |
| 2.45 | —CH—C=, —CH$_2$—C= | 6 |
| 2.05 | —CH$_2$— (ring) | 4 |
| 1.4 | —CH$_2$— (chain) | 16 |

The NMR spectrum is compatible with structures (I)–(III) and (V)–(VII), but the infrared spectrum eliminates structures (V)–(VII). The spectrum did not contain the two peaks at 5.46 and 5.68 p.p.m. for vinylidene protons on a conjugated terminal methylene group, as did the spectrum of the true unsaturated polyamide of Example III.

The multiplet peak found at $\delta=2.05$ p.p.m. can be ascribed to the two protons in the 4-position of the 2-piperidone rings of the structures (I)–(III). It is in accord with chemical shifts of $\delta=1.79$–1.96 p.p.m. reported in the literature (Weitkamp and Korte, Chem. Par., 95, 2896 (1962)) for protons in the 3- and 4-positions of 2-piperidone and 1-methyl-2-piperidone.

(3) Degradation of polyamide with hydrochloric acid solution: To 500 ml. of concentrated hydrochloric acid solution was added 11.2 g. of the polyamide of this example ($\eta_{inh}$ 0.715). The mixture was heated to reflux. The polymer dissolved after 30 min. but defluxing was continued for a total of 67 hrs. The clear, light yellow solution was cooled, filtered, and concentrated under reduced pressure with a rotary evaporator on a hot water bath. The viscous syrup obtained was further heated on a water bath at 0.2 mm. Hg to yield 16.7 g. of a green crystalline residue, softening at 135–140° C.

When the residue was reacted with p-toluenesulfonyl chloride by standard procedure, 26% of the theoretically present hexamethylenediamine was recovered as the known hexamethylene - bis - p-toluenesulfonamide, M.P. 151.5–152.5° C., mixed melting point with known material, synthesized independently from hexamethylenediamine, M.P. 151–152° C.

EXAMPLE III

Preparation of poly (hexamethylene $\alpha$-methyleneglutaramide) by interfacial condensation of $\alpha$-methyleneglutaryl dichloride with hexamethylenediamine This example will provide experimental evidence, for purposes of comparison only, that the linear, unsaturated polyamide structure (IV) can be prepared, and that it differes greatly from the corresponding cyclized polyamides, whose structure is expressed by Formulas (I)–(III) and (V)–(VII), in softening point, solubility in various solvents, as well as in its infrared and NMR spectra. In particular this example shows that a linear, unsaturated polyamide corresponding to the structure (IV) is obtained by interfacial polycondensation of $\alpha$-methyleneglutaryl dichloride and hexamethylenediamine in a manner known to the art. It is believed that the relatively low temperature of reaction (37° C.) during the interfacial polycondensation is responsible for the successful synthesis of the linear, unsaturated polyamide. By contrast, the common melt polycondensation techniques used to prepare the novel, cyclized polyamide of this invention all operate at much higher temperatures, broadly from 120–260° C.

(A) Preparation of $\alpha$-methyleneglutaryl dichloride

In a 1-l. single-necked reaction flask equipped with reflux condenser and drying tube was placed 58.4 g. (0.405 mole) of $\alpha$-methyleneglutaric acid, 143.0 g. (1.20 mole) thionyl chloride, and 0.30 g. of sublimed phenothiazine (as inhibitor). The mixture was heated at 55–60° C. for 8 hours and then allowed to stand overnight. Excess thionyl chloride was removed at 15 mm. Hg and the residue vacuum-distilled, B.P. 65–73° C. (1.2–1.3 mm. Hg), 56.7 g. (77.3%), clear, colorless liquid. Redistillation in vacuum through a 6 in. Vigreux column, with 0.30 g. phenothiazine inhibitor added to the distillation flask, afforded a single fraction, B.P. 51–2° C. (0.30 mm. Hg), 47.85 g. (65.2%) of $\alpha$-methyleneglutaryl dichloride, $n_D^{25}$ 1.4903. The infrared spectrum of a $CCl_4$ solution of the diacid chloride showed carbonyl bands at 1798 and 1748 cm.$^{-1}$. A strong band for terminal methylene conjugated with acid chloride is present at 960 cm.$^{-1}$. The NMR spectrum was in accord with the proposed $\alpha$-methyleneglutaryl dichloride structure.

Calculated for $C_6H_6Cl_2O_2$ (percent): C, 39.81; H, 3.34; Cl, 39.17. Found (percent): C, 40.02; H, 3.27; Cl, 39.50.

(B) Interfacial polycondensation to prepare polyamide

In blendor-mixer equipment, under nitrogen, was placed a solution of 4.746 g. (0.0262 mole) α-methyleneglutaryl dichloride, 0.023 g. sublimed phenothiazine, and 75 ml. benzene, followed by a solution of 2.900 g. (0.0250 mole) hexamethylenediamine, 6.20 g. (0.050 mole) sodium carbonate, and 80 ml. deionized water. The mixture was blended for 9 min. (final temperature: 37° C.). The polyamide produced was collected, washed with water, then moistened with an acetone solution of 0.0112 g. of phenothiazine added as an inhibitor of vinyl polymerization, and dried in vacuum at 50° C., 3.729 g. (66.6%), white solid, $\eta_{inh}=0.463$ (0.50 g./100 ml., m-cresol, 22.8° C.).

The polyamide was essentially insoluble in methanol, slightly soluble in trifluoroethanol, (<4%) and trifluoroacetic acid (<2%) at 77° C., more soluble in formic acid and dimethyl sulfoxide ($\infty 8\%$, with some gel noted, at 100° C.), and 99% soluble in m-cresol at 70–140° C. after 2 hours (0.5%).

The polyamide was estimated to be about 10% crystalline by X-ray measurements. Crystalline peaks were observed at 3.28, 2.93, and 2.82 A.

Differential thermal analysis indicates some crystalline melting at 127° C. under nitrogen or air. On further heating, a broad exotherm is noted at 266° C. (nitrogen) or 290° C. (air) which suggests the onset of vinyl polymerization. Decomposition endotherms are observed at about 400° C. A softening point of about 157° C. was observed with a hot stage melting point apparatus.

The infrared absorption spectrum (KBr pellet) contained a strong band for NH at 3280 cm.$^{-1}$, a characteristic polyamide band at 3070 cm.$^{-1}$; sharp bands at 2925 and 2850 cm.$^{-1}$ for methylenic hydrogen: strong bands in the carbonyl region at 1640 cm.$^{-1}$ with a shoulder at 1655 cm.$^{-1}$; a broad amide II band at 1535–1520 cm.$^{-1}$; a strong band at 1608 cm.$^{-1}$ for a carbon-carbon double bond; a medium band at 918 cm.$^{-1}$ for conjugated, terminal methylene; a medium band at 720 cm.$^{-1}$ for 3 or more adjacent methylene groups; and weak to medium bands at 1460, 1430, 1365, 1290, 1265, 1170, and 1005 cm.$^{-1}$.

The NMR spectrum (deuterated dimethyl sulfoxide solution) contained the following peaks:

| Peak, p.p.m. ($\delta$) to tetramethyl-silane | Structure | No. of hydrogens |
|---|---|---|
| 6.5 | —NHCO— | 2 |
| 5.46, 5.68 | CH$_2$=C—C= | 2 |
| 3.28 | —CH$_2$—N< | 4 |
| 2.50 | —CH$_2$—C= | 4 |
| 1.45 | —CH$_2$— (chain) | 8 |

The spectrum is in accord with the linear, unsaturated structure (IV).

EXAMPLE IV

Preparation of cyclized polyamide by the reaction of α-methyleneglutaronitrile, hexamethylenediamine, and water A stainless steel tubular reaction vessel was flushed with nitrogen and in it was placed 0.583 g. (5.03 mM.) hexamethylenediamine (as a 70% aqueous solution), 0.650 g. (6.13 mM.) α-methyleneglutaronitrile, and 0.966 g. of water. The reaction vessel was purged by alternating pressuring with nitrogen and releasing the pressure. The valve to the vessel was then closed and the vessel placed in a 160° C. oil bath for 1 hour. The bath temperature was raised to 180° C. and maintained for 24 hours. The polymerization was finished by heating for 1 hour at 180–185° C., using a nitrogen purge at atmospheric pressure as described in Example IC(1), and for 1 hour at 200–205° C. under vacuum at 0.5–1.5 mm. Hg. A tough, clear, light yellow polymer was recovered, 0.831 g. (74%), softening point 89° C., inherent viscosity 1.02 dl./g. (0.50 g./100 ml. m-cresol, 22° C.).

The infrared absorption spectrum (KBr pellet) for the polymer was very similar to that described for the polyamide of Example II. Very weak absorption is noted at 930 cm.$^{-1}$ for the conjugated terminal methylene group. In addition, medium absorption is present as shoulders in the 1720 and 1680 cm.$^{-1}$ region which can be attributed to the —CONRCO— group. These absorptions indicate that minor amounts of the α-methyleneglutarimide ring sequences (V)–(VII) may be present. Poly(α-methyleneglutarimide) prepared by free-radical promotion with benzoyl peroxide shows strong absorption in this region. Two strong bands are also found in this region of the spectrum of poly(N-methylacrylimide), prepared by reaction of poly(methyl methacrylate) and methylamine (G. Schröder, Makromol. Chem., 98, 227 (1966)), a polymer containing N - methyl - α,γ-dimethylglutarimide sequences bonded by methylene groups at the α,γ-positions.

EXAMPLE V

Preparation of cyclized polyamide by the reaction of α-methyleneglutaronitrile, hexamethylenediamine, and water In a 2 x 15 in. stainless-steel flanged pipe reactor, coated on the inside with a non-sticking formulation of Teflon resin, was placed 44.545 g. (0.4197 mole) of α-methyleneglutaronitrile, 48.774 g. (0.4197 mole) of 1,6-hexamethylenediamine, and 80 ml. of deionized water. As described in Example IV above the charge was heated 15.7 hrs. under autogenous pressure at 220–222° C., 0.5 hr. at 220° C. under 1 atm. of nitrogen with no nitrogen purge, 1.5 hrs. at 220° C. at 1 atm. nitrogen pressure with a nitrogen purge, and finally 6.5 hrs. at 200° C. under vacuum (0.9 mm. Hg). A total of 79.3 g. (84%) of a hard, yellow polyamide resin was isolated as an upper portion ($\eta_{inh}=0.37$) and a lower portion ($\eta_{inh}=0.54$).

EXAMPLE VI

Preparation of a cyclized polyamide from 2-methylpentamethylenediamine and α-methyleneglutaric acid (A) Salt preparation: To a solution of 14.40 g. (0.100 mole) of α-methyleneglutaric acid in 116 ml. of a 50:50 volume mixture of ethanol and isopropanol, was added a solution of 11.852 g. (0.102 mole) of 2-methylpentamethylenediamine (prepared by hydrogenation of α-methyleneglutaronitrile) in 20 ml. of 50:50 ethanol-isopropanol. The polysalt resisted crystallization. Crystallization was finally induced by repeatedly triturating the oily layer (in water-isopropanol) with successive portions of additional isopropanol, 19.899 g. (76.5%), M.P. 162.3° C.

Calculated for $C_{12}H_{24}N_2O_4$ (percent): C, 55.36; H, 9.29; N, 10.76. Found (percent): C, 54.82; H, 9.36; N, 10.43.

(B) Polyamide preparation: Several polyamidification reactions were carried out with the salt of part A of this Example VI according to the general method described in Example IC(1) above, and are summarized in Table 2 hereinafter. Soluble polyamides were obtained in high yield at 180–195° C. The infrared absorption spectrum (KBr pellet) indicates extensive cyclization as evidenced by only very weak absorption at 930 cm.$^{-1}$ for conjugated, methylenic unsaturation. Strong absorption is present in the carbonyl region at 1640–1625 cm.$^{-1}$, with a shoulder at 1655 cm.$^{-1}$. Carbonyl absorption in this region is expected for sequences (I)–(III). Medium shoulders are noted at 1720, 1710, and 1680 cm.$^{-1}$, indicating the presence of minor amounts of —CONRCO—, and the contribution of structures (V)–(VII), as explained in Example IV.

TABLE 2.—PREPARATION OF CYCLIZED POLYAMIDES FROM 2-METHYLPENTAMETHYLENEDIAMMONIUM α-METHYLENEGLUTARATE MPMDMG

| Example No. | MPMDMG charged, g. | Pressure °C. | Pressure Hrs. | Heating cycle [1] Atmos., °C. | Heating cycle [1] N₂, Hrs. | Vacuum °C. | Vacuum Hrs. | Percent conversion | Softening point, °C. | $\eta_{inh}$ [2] | Remarks |
|---|---|---|---|---|---|---|---|---|---|---|---|
| VI B(1) | 1.020 | 215-20 | 2 | 215-20 | 1 | 225 | 1 | 91.4 | 113 | Insoluble | Clear, colorless gel. |
| VI B(2) | 1.052 | 180 | 2 | 180 | 0.5 | 180 | 1 | 92.3 | 84 | 0.133 | Soluble polymer. |
| VI B(3) | 1.083 | 190-5 | 4 | 190-5 | 0.5 | 190-5 | 1 | 92.1 | 118-21 | 0.558 | Do. |

[1] The heating cycle is similar to that described in Example IC(1).
[2] 0.50 g./100 ml. m-cresol, room temperature.

EXAMPLE VII

Cyclized polyamide prepared by the condensation of 2-methylpentamethylenediamine with dimethyl α-methyleneglutarate (A) Preparation of dimethyl α-methyleneglutarate: α-Methyleneglutaric acid (144 g., 1 mole), methanol (122 ml., 3 moles), toluene (180 ml.), and conc. sulfuric acid (1.5 g.) were heated to reflux with removal of water by azeotropic distillation using a Dean-Stark trap. The two-phase distillate was periodically collected, freed of water with potassium carbonate, and returned to the reaction flask, until a clear distillate was obtained. Makeup methanol and toluene were added as needed to keep the reaction mixture at constant volume. The product was isolated by removal of solvents at reduced pressure, followed by vacuum distillation. A total of 82.7 g. (53.1%) of dimethyl α-methylglutarate was obtained, B.P. 55–58° C. (0.25 mm.). Redistillation under vacuum through a 6" Vigreux column gave a purified fraction, B.P. 69° (1.5 mm. Hg), clear, colorless liquid $n_D^{25}$ 1.44399 (Lit. $n_D^{25}$ 1.4436, U.S. Patent No. 2,522,366, 1952).

(B) Preparation of polyamide: To a heavy-walled, glass polymerization tube flushed with nitrogen was charged 0.697 g. (4.47 mM.) of dimethyl α-methyleneglutarate and 0.546 g. (4.71 mM.) of 2-methylpentamethylenediamine. The tube was evacuated and filled with nitrogen three times, sealed under nitrogen, and heated 2 hours at 210° C. On cooling, the tube was opened and heated with a nitrogen bleed at atmospheric pressure for 30 minutes at 210° C., then heated under 0.5 mm. Hg for one and one-half hours at 210–212° C. A quantitative yield of a yellow, brittle polymer was obtained, softening point 75° C., inherent viscosity 0.196 dl./g. (0.50 g./100 ml. m-cresol, 23.8° C.) (10% gel removed before viscosity determination).

The infrared absorption spectrum (KBr pellet) of the polyamide was practically identical with the spectrum of the polyamide of Example VI, except that the absorption in the 930 cm.⁻¹ region was lower, suggesting more extensive cyclization had occurred than when the polyamide was prepared by melt poly-condensation of the salt as in Example II. In addition, weak absorptions in the carbonyl region at 1720, 1710, and 1685 cm.⁻¹ are present and can be attributed to —CONRCO—, indicating small contributions of sequences (V)–(VII), as explained in Example IV above. Strong carbonyl absorption is present at 1640–1620, with shoulders at 1670 and 1660 cm.⁻¹, consistent with structure sequences (I)–(III).

EXAMPLE VIII

Preparation of cyclized polyamide by melt polycondensation of ethylenediammonium α-methyleneglutarate (A) Salt formation: To 14.85 g. (103 mM.) of α-methyleneglutaric acid in 113 ml. of ethanol was added a solution of 6.314 g. (105 mM.) redistilled ethylenediamine in 20 ml. of ethanol under a nitrogen atmosphere. An exotherm to 45–50° C. was observed. After stirring 15 minutes the mixture was cooled to 15–20° C. to precipitate the salt, which was collected, washed well with cold alcohol, and dried in vacuum, 20.40 g. (97.2%), M.P. 148–150° C.

Calculated for $C_8H_{16}N_2O_4$ (percent): C, 47.07; H, 7.90; N, 13.72. Found (percent): C, 47.10; H, 7.83; N, 13.90.

(B) Polyamide preparation: Polyamidification experiments were carried out using the salt melt polycondensation method described in Example IC(1) and the results are summarized in Table 3 hereinafter. Soluble polyamides of rather low molecular weight were obtained.

The infrared absorption spectrum (KBr pellet) contains only very weak absorption at 930 cm.⁻¹, consistent with only inappreciable amounts of conjugated methylenic unsaturation and showing that the polyamide is extensively cyclized. Strong absorption is present in the carbonyl region at 1660–1625 cm.⁻¹, with a shoulder at 1670 cm.⁻¹, consistent with cyclic sequences (I)–(III). Medium absorption (shoulders) at 1720 and 1685 cm.⁻¹ indicate minor contributions of cyclic sequences (VI)–(VII) as explained in Example IV.

TABLE 3.—PREPARATION OF CYCLIZED POLYAMIDES FROM ETHYLENEDIAMMONIUM α-METHYLENEGLUTARATE (EDAMG)

| Example No. | EDAMG charged, g. | Pressure °C. | Pressure Hrs. | Heating cycle [1] Atmos., °C. | Heating cycle [1] N₂, Hrs. | Vacuum °C. | Vacuum Hrs. | Percent conversion | $\eta_{inh}$ [2] | Softening point, °C | Remarks |
|---|---|---|---|---|---|---|---|---|---|---|---|
| VIII(1) | 1.213 | 190-95 | 2 | 190-95 | 0.5 | 190-95 | 1 | 103 | 0.163 | 136 | Clear yellow plastic, sl. tacky. |
| VIII(2) | 1.249 | 215 | 2 | 215 | 0.5 | 215-20 | 1 | 102 | 0.273 | 169 | Clear, yellow, sl. brittle polymer. |

[1] The heating cycles are similar to those described in Example 1C-1.
[2] 0.50 g./100 ml. m-cresol, room temperature.

EXAMPLE IX

Preparation of a rubber-substitute from cyclized polyamide (A) Demonstration of the crosslinkability of the cyclized polyamide with di-tertiary butyl-peroxide: A 6.00 g. specimen of the purified polyamide prepared as in Example II above was cut into small pieces and moistened with 10 ml. of a solution of 0.375 g. of di-tertiary butyl peroxide dissolved in 25 ml. acetone. The treated polyamide was dried in vacuum at room temperature for one-half hour and then subjected to compression molding at 120–130° C. for 35 min. between Teflon sheets. A clear, pale tan, tough, rubbery molded sheet was obtained. A 1.0 g. portion of the peroxide-cured polyamide was placed in 10 ml. of methanol in a closed flask, and was found to be insoluble. Extensive swelling was observed. As a control, a specimen of the purified polyamide not treated with peroxide was pressed under identical conditions. A similar solubility test showed that this pressed, purified polyamide was completely soluble in methanol under identical conditions. These tests clearly demonstrate that the polyamide undergoes crosslinking when treated with di-tertiary butyl peroxide.

(B) Vulcanization of compounded, cyclized polyamide: A larger specimen of 100 parts by weight of cyclized polyamide prepared as in Example II above is softened with about 5 parts by weight of 2-ethylhexanol and banded at 100° C. on a special rubber mill having Teflon-coated steel rolls. To the milled polyamide is added 50 parts by weight of carbon black (Super Abrasion Furnace Black) and 3.0 parts of di-tertiary butyl peroxide. The mixture is milled for about 5 minutes and removed from the mill. Sheets are cured in a heated hydraulic press at 120–130° C. for 35–60 minutes, between Teflon-coated steel plates. The cured sheets have excellent rubbery properties, with high resistance to aliphatic and aromatic hydrocarbons.

What is claimed is:

1. A resinous cyclic polyamide in which the structure of the cyclic portions are predominantly 2-piperidone rings which cyclic polyamide consists essentially of repeating units of the Formulas I–III, V–VII:

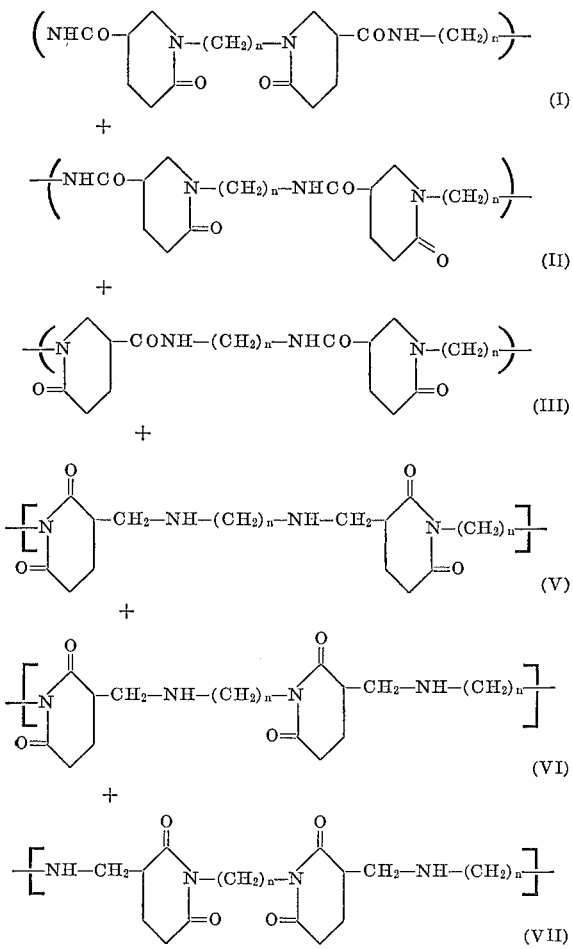

2. The resinous cyclic polyamide of claim 1 wherein said 2-piperidone rings are combined into said polyamide product through their N,5-positions.

3. A process for preparation of a resinous cyclic polyamide in which the structures of the components of the cyclic polyamide are predominantly 2-piperidone rings, which comprises heating, in an inert atmosphere, a preformed 1:1 molar ratio diamine salt of α-methyleneglutaric acid for from 0.5–24 hours at temperatures between 125–260° C.

4. The process of claim 3 in which the heating of the salt is carried out in multiple stages of varying pressures comprising, sequentially, a pressure cycle, an atmospheric cycle and a vacuum cycle.

5. The process of claim 4 in which the inert atmosphere is a gas selected from the group consisting of nitrogen, argon and helium.

6. The process of claim 3 which further comprises heating in the presence of a vinyl polymerization inhibitor, whereby gelation at high temperature is reduced.

7. The process of claim 3 wherein said cyclic polyamide comprises repeating units of the Formulas I–III, V–VII:

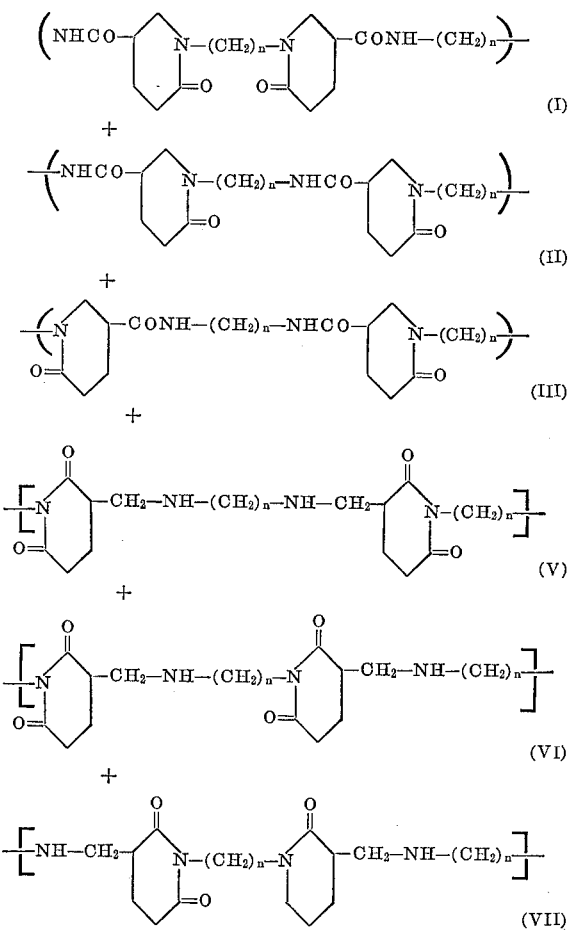

8. The process of claim 3 wherein said diamine salt is a salt of an α-methyleneglutaric acid having the general structure:

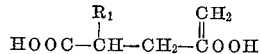

wherein $R_1$ is selected from the group consisting of hydrogen, lower alkyl, cycloalkyl and an aryl group.

9. The process of claim 3 wherein said diamine salt is formed from a diamine reactant component corresponding to the general formula

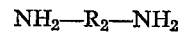

said diamine reactant component being a primary diamine in which $R_2$ may be selected from the group consisting of a linear polymethylene chain containing from two to twelve methylene groups, a polymethylene chain containing from two to twelve methylene groups in which from 1–3 methylenic hydrogens are substituted by lower alkyl groups, a polymethylene chain wherein a phenylene nucleus is inserted between two adjacent methylene groups, an arylene divalent radical, a m-phenylene divalent radical, a p,p'-biphenylene divalent radical and mixtures thereof.

10. The process of claim 3 wherein said diamine salt is hexamethylenediammonium α-methyleneglutarate and said temperature is 180–230° C.

11. The process of claim 3 wherein said diamine salt is 2 - methylpentamethylenediammonium α-methyleneglutarate, and said temperature is 180–195° C.

12. The process of claim 4 wherein said multiple stages of varying pressures comprise an autogenous heating step at 125–260° C. for 0.5–24 hours, a following atmospheric step at 125–260° C. for 0.25–6 hours and a vacuum heating step at 125–260° C. for 1–10 hours at .001–10 mm. Hg.

13. A process for preparation of a resinous cyclic polyamide in which the structure of the components of the cyclic polyamide are predominantly 2-piperidone rings, which comprises reacting α-methyleneglutaronitrile and a diamine in the presence of 2–25 moles of water per mole of dinitrile for 3–66 hours, in an inert atmosphere and at temperatures in the range of 125–260° C., the mole ratio of dinitrile to diamine being 1:0.5 to 1:1.5.

14. The process of claim 13 in which the reaction is carried out in multiple heating stages of a varying pressures comprising, sequentially, a pressure cycle, an atmospheric cycle, and a vacuum cycle.

15. The process of claim 13 wherein said multiple heating stages of varying pressures comprise a first autogenous heating step at 125–260° C. for 2–48 hours, the following atmospheric step at 160–250° C. for 0.5–6 hours and a vacuum heating step at 150–260° C. for 0.5–12 hours at a pressure of .001–10 mm. Hg.

16. The process of claim 13 which further comprises heating in the presence of a vinyl polymerization inhibitor, whereby gelation at high temperatures is reduced.

17. The process of claim 13 wherein said diamine reactant component corresponds to the general formula $NH_2$—$R_2$—$NH_2$ said diamine reactant component being a primary diamine in which $R_2$ may be selected from the group consisting of a linear polymethylene chain containing from two to twelve methylene groups, a polymethylene chain containing from two to twelve methylene groups in which from 1–3 methylenic hydrogens are substituted by lower alkyl groups, a polymethylene chain wherein a phenylene nucleus is inserted between two adjacent methylene groups, an arylene divalent radical, a m-phenylene divalent radical, a p,p'-biphenylene divalent radical and mixtures thereof.

18. The process of claim 14 in which the inert atmosphere is a gas selected from the group consisting of nitrogen, argon and helium.

19. A process for preparation of a resinous cyclic polyamide in which the structures of the components of the cyclic polyamide are predominantly 2-piperidone rings, which comprises reacting a dialkyl ester or a diaryl ester of α-methyleneglutaric acid and a diamine having the formula $NH_2$—$R_2$—$NH_2$ wherein $R_2$ is selected from the group consisting of linear polymethylene, lower alkyl-substituted polymethylene, polymethylene having a phenylene group in the chain, and arylene, in an inert atmosphere and at temperatures in the range of 120–240° C., the mole ratio of diester:diamine being from 1.0:0.5 to 1.0:1.5.

20. The process of claim 19 in which the reaction is carried out in multiple heating stages of varying pressures comprising, sequentially, a pressure cycle, an atmospheric cycle, and a vacuum cycle.

21. The process of claim 19 wherein said diester is a dialkyl ester.

22. The process of claim 19 wherein said diamine reactant compound corresponds to the general formula $NH_2$—$R_2$—$NH_2$ said diamine reactant component being a primary diamine in which $R_2$ may be selected from the group consisting of a linear polymethylene chain containing from two to twelve methylene groups, a polymethylene chain containing from two to twelve methylene groups in which from 1–3 methylenic hydrogens are substituted by lower alkyl groups, a polymethylene chain wherein a phenylene nucleus is inserted between two adjacent methylene groups, an arylene divalent radical, a m-phenylene divalent radical, a p,p'-biphenylene divalent radical and mixtures thereof.

23. The process of claim 20 wherein said multiple heating stages of varying pressures comprise an autogenous heating step at 150–250° C., an atmospheric heating step for 0.25–10 hours and a vacuum heating step at 120–240° C. at a pressure of .001–10 mm. Hg.

24. The process of claim 20 which further comprises heating in the presence of a vinyl polymerization inhibitor, whereby gelation at high temperatures is reduced.

References Cited

UNITED STATES PATENTS

| | | | |
|---|---|---|---|
| 2,174,619 | 10/1939 | Carothers | 260—78 |
| 2,245,129 | 6/1941 | Greenewalt | 260—78 |
| 2,265,450 | 12/1941 | Reppe et al. | 260—88.3 |
| 2,421,024 | 5/1947 | Frosch | 260—78 |
| 2,502,576 | 4/1950 | Lincoln et al. | 260—78 |
| 2,609,385 | 9/1952 | Schreyer | 260—78 |
| 2,676,949 | 4/1954 | Morner et al. | 260—88.3 |
| 3,452,117 | 6/1969 | Gaylord | 260—78 |

HAROLD D. ANDERSON, Primary Examiner

U.S. Cl. X.R.

117—124, 161; 260—31.2, 33.4, 37, 41, 88.3